United States Patent
Goodyear et al.

(10) Patent No.: US 9,985,488 B2
(45) Date of Patent: May 29, 2018

(54) ENVIRONMENTALLY ROBUST ELECTROMAGNETS AND ELECTRIC MOTORS EMPLOYING SAME FOR USE IN NUCLEAR REACTORS

(75) Inventors: Brett T. Goodyear, Twinsburg, OH (US); Robert W. Emond, North Ridgeville, OH (US); William H. Yeadon, Iron River, MI (US)

(73) Assignee: RWXT Nuclear Operations Group, Inc., Lynchburg, VA (US)

( * ) Notice: Subject to any disclaimer, the term of this patent is extended or adjusted under 35 U.S.C. 154(b) by 897 days.

(21) Appl. No.: 13/188,946

(22) Filed: Jul. 22, 2011

(65) Prior Publication Data

US 2013/0022163 A1    Jan. 24, 2013

(51) Int. Cl.
  *H02K 3/18*     (2006.01)
  *G21C 7/12*    (2006.01)
  (Continued)

(52) U.S. Cl.
  CPC ............. *H02K 3/18* (2013.01); *G21C 7/12* (2013.01); *G21C 15/24* (2013.01); *H01F 5/02* (2013.01);
  (Continued)

(58) Field of Classification Search
  None
  See application file for complete search history.

(56) References Cited

U.S. PATENT DOCUMENTS

| | | | |
|---|---|---|---|
| 2,982,888 | A | 5/1961 | Whearley |
| 3,325,374 | A | 6/1967 | Margen |

(Continued)

FOREIGN PATENT DOCUMENTS

| | | |
|---|---|---|
| CN | 2835664 | 11/2006 |
| CN | 101369468 | 2/2009 |

(Continued)

OTHER PUBLICATIONS

International Search Report and Written Opinion for PCT/US2012/046382 dated Sep. 17, 2012.

(Continued)

*Primary Examiner* — Jack W Keith
*Assistant Examiner* — Lily C Garner
(74) *Attorney, Agent, or Firm* — Nelson Mullins Riley & Scarborough LLP

(57) ABSTRACT

An electromagnet comprises a plurality of nested freestanding electrically insulating former layers, and electrically conductive wire wrapped around the outsides of the freestanding electrically insulating former layers to define a multilayer electrical coil in which adjacent layers of the multilayer electrical coil are spaced apart by intervening freestanding electrically insulating former layers. Electrically energizing the multilayer electrical coil generates a magnetic field inside the multilayer electrical coil. In some embodiments the electrically conductive wire is bare wire not having electrical insulation. In some embodiments the former layers comprise a ceramic material. In some such embodiments the electromagnet further comprises a ferromagnetic core disposed inside the multilayer electrical coil. An electric motor employing such an electromagnet as a stator pole is also disclosed. Control rod drive mechanism (CRDM) and coolant pump embodiments are also disclosed employing such a motor, for use in a nuclear reactor.

30 Claims, 14 Drawing Sheets

(51) Int. Cl.
  *G21C 15/24* (2006.01)
  *H02K 3/52* (2006.01)
  *H01F 5/02* (2006.01)

(52) U.S. Cl.
  CPC ....... *H02K 3/522* (2013.01); *H01F 2005/025* (2013.01); *H02K 2203/12* (2013.01); *Y02E 30/39* (2013.01); *Y10T 29/49071* (2015.01)

(56) References Cited

U.S. PATENT DOCUMENTS

| | | |
|---|---|---|
| 3,389,055 A | 6/1968 | Hughes |
| 4,039,377 A | 8/1977 | Andrieu et al. |
| 4,057,467 A | 11/1977 | Kostrzewa |
| 4,072,563 A | 2/1978 | McDonald et al. |
| 4,238,288 A | 12/1980 | Anikin et al. |
| 4,252,605 A | 2/1981 | Schaffer |
| 4,315,800 A | 2/1982 | Yoshimoto et al. |
| 4,423,002 A | 12/1983 | Wiart et al. |
| 4,696,783 A | 9/1987 | Lesaulnier et al. |
| 4,696,792 A | 9/1987 | Hobson |
| 4,734,250 A | 3/1988 | Veronesi |
| 4,765,948 A * | 8/1988 | DeLuca et al. ............... 376/404 |
| 4,859,885 A | 8/1989 | Kliman et al. |
| 4,886,430 A | 12/1989 | Veronesi et al. |
| 4,905,757 A | 3/1990 | Boardman et al. |
| 5,053,190 A | 10/1991 | Gardner et al. |
| 5,073,335 A | 12/1991 | Townsend |
| 5,082,620 A | 1/1992 | Fennern |
| 5,118,466 A | 6/1992 | Raymond et al. |
| 5,124,115 A | 6/1992 | Dillmann |
| 5,135,711 A | 8/1992 | Borchardt et al. |
| 5,165,305 A | 11/1992 | Veronesi |
| 5,174,945 A | 12/1992 | Bussard et al. |
| 5,258,084 A | 11/1993 | Leung et al. |
| 5,295,171 A | 3/1994 | Aburomia et al. |
| 5,307,384 A | 4/1994 | King et al. |
| 5,449,180 A | 9/1995 | Monjean et al. |
| 5,642,011 A | 6/1997 | Fanning et al. |
| 5,744,888 A * | 4/1998 | Zajc ....................... H02K 1/148 310/179 |
| 5,969,455 A | 10/1999 | Sakamoto |
| 6,130,927 A | 10/2000 | Kang et al. |
| 6,137,202 A | 10/2000 | Holmes et al. |
| 6,177,751 B1 | 1/2001 | Suzuki et al. |
| 6,259,760 B1 | 7/2001 | Carelli et al. |
| 6,275,557 B2 | 8/2001 | Nylund et al. |
| 6,328,541 B1 | 12/2001 | Veronesi et al. |
| 6,335,582 B1 * | 1/2002 | Abukawa ............... H02K 1/146 310/156.38 |
| 6,504,888 B1 | 1/2003 | Fife et al. |
| 6,555,942 B1 | 4/2003 | Hsu |
| 6,636,578 B1 | 10/2003 | Clark |
| 6,636,580 B2 | 10/2003 | Murakami et al. |
| 6,813,328 B2 | 11/2004 | Kitch et al. |
| 6,819,733 B2 | 11/2004 | Broders et al. |
| 6,865,242 B2 | 3/2005 | Barbe et al. |
| 6,879,075 B2 * | 4/2005 | Calfo ................... H02K 1/2766 310/156.01 |
| 6,879,077 B2 | 4/2005 | Otsuki et al. |
| 6,926,588 B2 | 8/2005 | Janssen et al. |
| 7,085,340 B2 | 8/2006 | Goldenfield et al. |
| 7,257,185 B1 | 8/2007 | Yamada et al. |
| 7,268,456 B2 | 9/2007 | Harada et al. |
| 7,452,358 B2 | 11/2008 | Stern et al. |
| 7,453,972 B2 | 11/2008 | Hellandbrand, Jr. et al. |
| 7,561,654 B2 | 7/2009 | Makovicka et al. |
| 7,668,280 B2 | 2/2010 | Hellandbrand, Jr. et al. |
| 7,668,284 B2 | 2/2010 | Sparrow et al. |
| 8,532,246 B2 | 9/2013 | Pomirleanu et al. |
| 8,590,419 B2 | 11/2013 | Finegan et al. |
| 2008/0242551 A1 * | 10/2008 | Painter .................. 505/431 |
| 2009/0206974 A1 * | 8/2009 | Meinke .................. 336/224 |
| 2009/0251270 A1 * | 10/2009 | Meinke .............. G01R 33/3804 336/208 |
| 2010/0183113 A1 | 7/2010 | Ishida et al. |
| 2010/0254505 A1 | 10/2010 | Spilchal, Jr. |
| 2010/0316177 A1 * | 12/2010 | Stambaugh et al. .......... 376/229 |

FOREIGN PATENT DOCUMENTS

| | | |
|---|---|---|
| CN | 101694958 A * | 4/2010 |
| DE | 1925182 | 11/1970 |
| DE | 3729615 | 3/1989 |
| EP | 0395037 | 10/1990 |
| JP | H05-209991 A | 8/1993 |
| JP | H06-290944 A | 10/1994 |
| JP | H11-030683 A | 2/1999 |
| JP | 2005-274533 A | 10/2005 |
| JP | 2006-521178 A | 9/2006 |
| JP | 2011-103733 A | 5/2011 |
| TW | 351813 | 2/1999 |
| WO | 1992/09092 | 5/1992 |
| WO | 2002/03527 | 1/2002 |

OTHER PUBLICATIONS

Office Action dated May 10, 2016 for Japanese Application No. 2014-521661.
Second Office Action dated Jun. 20, 2016 for Chinese Application No. 201210136260.2.
Office Action dated Aug. 31, 2015 for Chinese Patent Application No. 201210136260.2.
Extended Search Report dated Nov. 16, 2015 for European Patent Application No. 12817197.2.
Office Action dated Oct. 29, 2015 for Taiwan Patent Application No. 101126039.

* cited by examiner

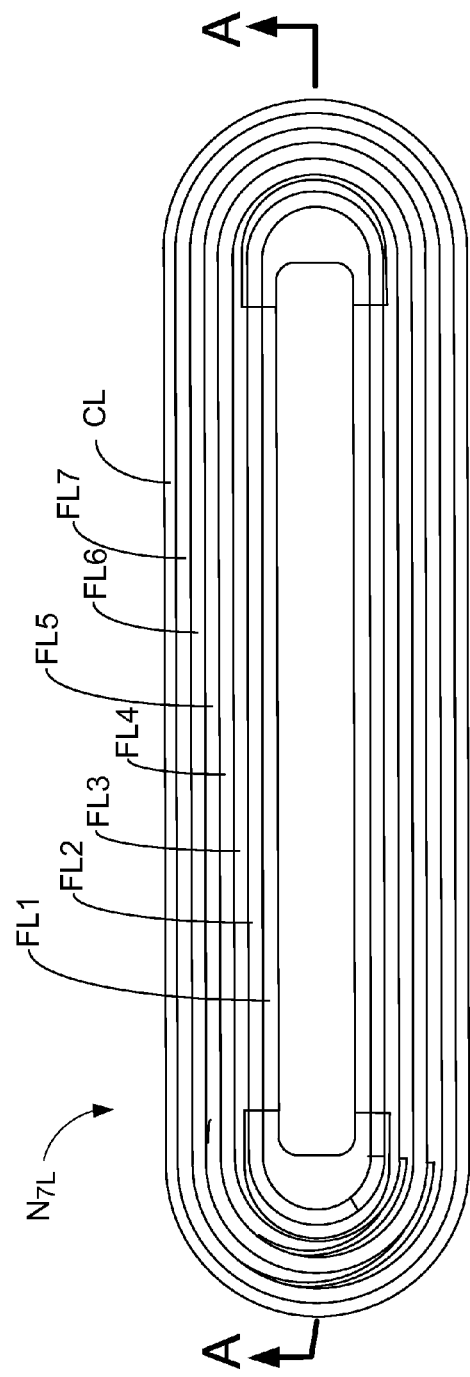
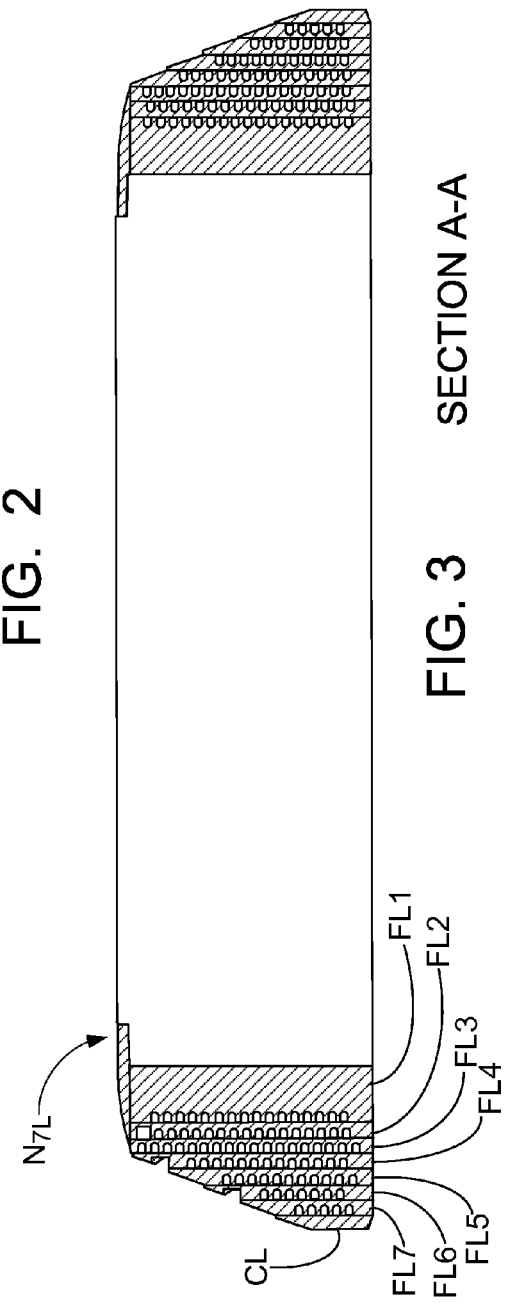
FIG. 2
FIG. 3 SECTION A-A

US 9,985,488 B2

ENVIRONMENTALLY ROBUST ELECTROMAGNETS AND ELECTRIC MOTORS EMPLOYING SAME FOR USE IN NUCLEAR REACTORS

BACKGROUND

The following relates to the electrical arts, electrical device arts, electromagnet arts, electric motor arts, nuclear reactor arts, and related arts.

A pressurized water reactor (PWR) employs a pressure vessel containing superheated water as the primary coolant. Hot, subcooled water is circulated between the reactor core and one or more steam generators to transfer energy from the reactor core to the steam generator. In a conventional design, the steam generators are separate elements and the primary coolant is coupled between the pressure vessel and the steam generator via suitable high pressure fluid conduits. In an integral PWR design, the one or more steam generators are located inside the pressure vessel. Other types of nuclear reactors are similar. For example, a boiling water reactor (BWR) employs boiling primary coolant which is not superheated.

It is advantageous to include motorized components inside the pressure vessel of a nuclear reactor. For example, in some reactor designs the primary coolant is actively circulated using electric motor-driven coolant pumps. The pumps may be located outside the pressure vessel and mechanically coupled with the impeller via a rotating shaft passing through a suitable vessel penetration. However, it is advantageous to eliminate the mechanical pass-through vessel penetration by employing wholly internal motor-driven coolant pumps. In this latter design, only small and mechanically static vessel penetrations for electrical cabling are employed.

Another place where a motorized component can be useful is in control rod drive mechanism (CRDM) components. A control rod containing a neutron absorber is inserted partway or fully into the reactor core in order to moderate or stop the nuclear reaction. In so-called "gray" rods, the extent of the rod insertion is adjustable in a continuous or step-wise fashion in order to provide adjustable reactivity control. Traditionally, the electric motor operating the control rod is located outside the pressure vessel (typically above the pressure vessel in PWR designs or below the pressure vessel in BWR designs) and a connecting rod passes through a suitable vessel penetration to connect the CRDM motor with the control rod. Again, it is advantageous to eliminate the mechanical vessel penetration by employing a wholly internal CRDM in which the electric motor operating the control rod is located inside the pressure vessel, so that only mechanically static vessel penetrations for electrical cabling are employed.

Employing electric motors inside the pressure vessel is complicated by the high temperature of the primary coolant. The electric motor and its constituent materials must be robust against the high temperature of the reactor environment, and must also be robust against other environmental conditions such as corrosive chemicals and/or radioactivity that may be present in the primary coolant. For example, PWR reactors typically employ boric acid as a soluble reactivity-moderating neutron poison in the primary coolant. Moreover, the electric motor must be reliable since any maintenance entails the costly proposition of shutting down and opening the reactor while taking suitable containment and radioactive waste control precautions.

Disclosed herein are improvements that provide benefits that will become apparent to the skilled artisan upon reading the following.

BRIEF SUMMARY

In one aspect of the disclosure, an apparatus comprises an electromagnet comprising a plurality of nested freestanding electrically insulating former layers, and electrically conductive wire wrapped around the outsides of the freestanding electrically insulating former layers to define a multilayer electrical coil in which adjacent layers of the multilayer electrical coil are spaced apart by intervening freestanding electrically insulating former layers. Electrically energizing the multilayer electrical coil generates a magnetic field inside the multilayer electrical coil. In some embodiments of such an apparatus, the electrically conductive wire is bare electrically conductive wire not having electrical insulation. In some embodiments of such an apparatus, the freestanding electrically insulating former layers comprise a ceramic material. In some such embodiments, the electromagnet further comprises a ferromagnetic core disposed inside the multilayer electrical coil. In some such embodiments, the apparatus further comprises an electric motor including a rotor and a stator, wherein said electromagnet defines a pole of the stator. In some such embodiments, the apparatus further comprises a control rod drive mechanism (CRDM) including said motor and a lead screw, the motor being operatively coupled with the lead screw to linearly drive the lead screw whereby a control rod containing a neutron poison connected with the lead screw is linearly driven into or out of a nuclear reactor core. In some such embodiments, the apparatus further comprises a fluid pump including said motor operatively connected with an impeller.

In another aspect of the disclosure, an apparatus comprises an electromagnet comprising a plurality of nested freestanding electrically insulating former layers, and a multilayer electrical coil comprising a plurality of spaced apart electrically conductive helical winding layers in which each spaced apart electrically conductive helical winding layer is supported by one of the freestanding electrically insulating former layers of the nest, wherein electrically energizing the multilayer electrical coil generates a magnetic field in inside the multilayer electrical coil. In some such electromagnets, each freestanding electrically insulating former layer includes a groove formed on an outside surface of the freestanding electrically insulating former layer that defines the path of the helical winding layer supported by the freestanding electrically insulating former layer. In some such electromagnets, a ferromagnetic electromagnet core disposed inside the multilayer electrical coil. Some such apparatus further comprise an electric motor including a rotor and a stator defined by said electromagnet. Some such apparatus further comprise a nuclear reactor including a pressure vessel containing primary coolant and a nuclear reactor core disposed in the pressure vessel and operative to maintain the primary coolant at a temperature of at least 300° C., and at least one electromechanical component (by way of illustrative example, a primary coolant pump or a control rod drive mechanism or CRDM) submerged in the primary coolant and including said electric motor.

In another aspect of the disclosure, a method comprises: (1) helically wrapping electrically conductive wire around a first freestanding electrically insulating former layer with the helical turns of the helical wrapping spaced apart from each other to form a first electrical coil layer; (2) nesting the first electrical coil layer inside a next freestanding electrically insulating former layer to form a nest; (3) helically wrapping electrically conductive wire around the next freestanding electrically insulating former layer of the nest with the helical turns of the helical wrapping spaced apart from each other to form a next electrical coil layer, wherein a multilayer electrical coil including at least two electrical coil layers is formed by a process including at least the operations (1), (2), and (3). In some such method embodiments, the multilayer electrical coil is formed by a process including at least the operations (1), (2), and (3) and further including at least one repetition of the operations (2) and (3) to form the multilayer electrical coil including at least three electrical coil layers. In some such method embodiments, after the forming of the multilayer electrical coil a ferromagnetic core is disposed inside the formed multilayer electrical coil to form an electromagnet. Some disclosed method embodiments further include disposing the electromagnet inside a pressure vessel of a nuclear reactor, operating the nuclear reactor to generate a temperature inside the pressure vessel of at least 300° C., and operating the electromagnet inside the pressure vessel with the temperature inside the pressure vessel being at least 300° C.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 2-11 show an electromagnet and various components and assembly aspects thereof. Of these, FIG. 2 are top views, FIGS. 3 and 5 are side sectional views, FIGS. 4 and 6-8 are perspective views, FIG. 9 is a diagrammatic assembly flow view, FIG. 10 is a partially exploded perspective view, and FIG. 11 is a perspective view in partial section.

FIG. 12 is a perspective view, FIG. 13 is a sectional perspective view, and FIG. 14 is an end view.

DETAILED DESCRIPTION OF THE PREFERRED EMBODIMENTS

Figure 1:
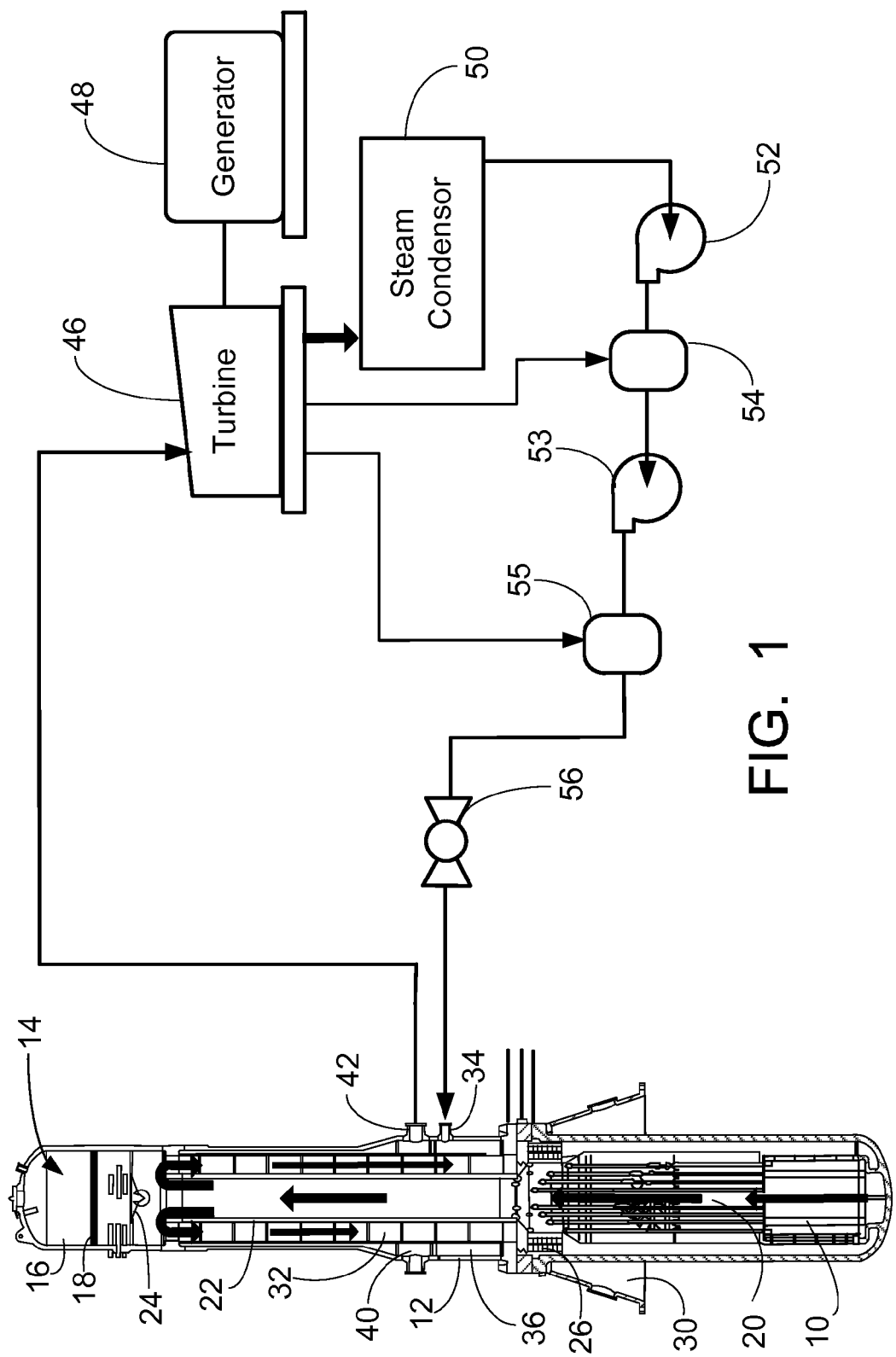
FIG. 1 diagrammatically shows an illustrative pressurized water reactor (PWR) nuclear power system.

With reference to FIG. 1, a perspective sectional view an illustrative pressurized water nuclear reactor (PWR) including an integral steam generator is shown. A nuclear reactor core 10 is disposed inside a generally cylindrical pressure vessel 12, which contains primary coolant 14, which in the illustrative case of a light water reactor is water ($H_2O$) optionally containing additives such as soluble boric acid serving as a soluble neutron poison. The PWR includes a steam bubble 16 in the upper portion of the volume, with a water level 18 delineating between the steam bubble 16 and the liquid primary coolant 14. Pressure is adjusted via the steam bubble 16, using electric heaters or the like or an external pressurizer (components not shown).

Reactor control is provided by a control rod drive mechanism (CRDM) 20 that is configured to controllably insert and withdraw neutron-absorbing control rods into and out of the nuclear reactor core 10. The CRDM 20 may be divided into multiple units, each controlling one or more control rods, in order to provide redundancy or other benefits. The illustrative CRDM 20 is an internal system in which the drive motors and other components are disposed inside the pressure vessel 12 and submerged in the primary coolant 14, with only electrical power and control wiring extending outside the pressure vessel 12. Alternatively, external CRDM may be employed.

The pressure vessel 12 is configured to define a desired circulation of the primary coolant 14. In the illustrative example, the circulation is defined by a hollow cylindrical central riser 22 disposed coaxially in the illustrative cylindrical pressure vessel 12. Primary coolant 14 heated by the reactor core 10 flows upward through fluid conduits passing through the internal CRDM 20 and upward through the hollow central riser 22, discharges at the top of the hollow central riser 22 and is diverted downward by a diverter 24, flows downward through an annulus defined between the cylindrical central riser 22 and the walls of the cylindrical pressure vessel 12, and is then diverted upward at the bottom of the pressure vessel 12 to return to the reactor core 10. Optional primary coolant pumps 26 may be provided to drive the circulation of the primary coolant 14, or to assist natural circulation of the primary coolant 14. The illustrative coolant pumps 26 are internal pumps which are wholly inside the pressure vessel 12 and submerged in the primary coolant 14, with only electrical power and optional control wiring extending outside the pressure vessel 12. Alternatively, natural circulation may be relied upon for circulating the primary coolant.

The pressure vessel 12 is suitably positioned substantially vertically. An optional skirt 30 may be provided to support the pressure vessel 12, or to bias against the pressure vessel 12 tipping over. The illustrative skirt 30 is positioned such that the lower portion of the pressure vessel 12 containing the reactor core 10 is located in a recess below ground, which facilitates flooding for safety in the event of a loss of coolant accident (LOCA) or other accident. In the operative state of the nuclear reactor, the CRDM 20 withdraws (or at least partially withdraws) the control rods from the nuclear reactor core 10 to initiate a nuclear reaction in the core 10. In a thermal nuclear reactor, the primary coolant 14 serves as a neutron moderator to thermalize higher energy neutrons so as to maintain or enhance the nuclear reaction. In the operating state of a PWR, the primary coolant 14 is superheated and is at a temperature of typically at least 300° C., and in some embodiments is at a temperature of at least 350° C. In the case of a BWR, the primary coolant is not superheated but is boiling, and the boiling primary coolant is typically at a temperature of at least at 300° C. and in some embodiments at least 350° C.

To provide steam generation, the primary coolant 14 heated by the operating reactor core 10 is brought into thermal communication with a secondary coolant (typically light water, $H_2O$ optionally containing various additives, solutes, or so forth) flowing in a steam generator. In some embodiments (not illustrated), the steam generator is external to the pressure vessel and connected therewith by a relatively large-diameter vessel penetration carrying the primary coolant. In the illustrative embodiment of FIG. 1, however, an integral steam generator 32 is located inside the same pressure vessel 12 containing the reactor core 10. The illustrative integral steam generator 32 is located in the annulus surrounding the central riser 22, that is, in the annular space between the exterior of the central riser 22 and the inside walls of the pressure vessel 12. Secondary coolant in the form of feedwater is input via a feedwater inlet 34 into an annular feedwater inlet plenum 36 (or, alternatively, into a tubesheet) where it feeds into a lower end of the steam generator 32. The secondary coolant rises generally upward through the steam generator 32 in secondary coolant flow paths or volume that are in thermal communication with (but in fluid isolation from) proximate primary coolant flow paths or volume through which primary coolant flows generally downward. (Note that FIG. 1 does not show details of the steam generator). The steam generator configuration can take various forms. In some embodiments, the steam generator comprises tubes carrying primary coolant generally downward, while the secondary coolant flows generally upward in a volume outside of the tubes. Alternatively, the secondary coolant may flow generally upward through the steam generator tubes while the primary coolant flows generally downward outside of the tubes. The tubes may comprise straight vertical tubes, slanted vertical tubes, helical tubes wrapping around the central riser 22, or so forth. However arranged, heat transfer takes place from the superheated primary coolant to the secondary coolant, which converts the secondary coolant from the liquid phase to the steam phase. In some embodiments the steam generator may include an integral economizer in a lower portion of the steam generator. In some embodiments, the steam generator may comprise a plurality of constituent steam generators to provide redundancy. The resulting steam enters an annular steam plenum 40 (or, alternatively, into a tubesheet) and from there passes out one or more steam outlets 42.

The steam (whether generated by an integral steam generator such as the illustrative integral steam generator 32, or by an external steam generator unit) can be used for substantially any purpose suitably accomplished using steam power. In the illustrative electrical plant of FIG. 1, the steam drives a turbine 46 which in turn drives an electrical power generator 48 to produce electrical power. A steam condenser 50 downstream of the turbine 46 condenses the steam back into a liquid phase so as to recreate secondary coolant comprising feedwater. One or more pumps 52, 53 and one or more feedwater heaters 54, 55 or other feedwater conditioning components (e.g., filters, components for adding additives, or so forth) generate feedwater at a desired pressure and temperature for input to the feedwater inlet 34. A feedwater valve 56 suitably controls the inlet feedwater flow rate.

The internal CRDM 20 and the internal coolant pumps 26 are immersed in the primary coolant 14, and should be robust against the elevated primary coolant temperature, which in some embodiments is at least 300° C. and in some embodiments is at least 350° C. Conventional insulated wires typically undergo relatively rapid degradation at these temperatures which can lead to accelerated failure by arcing or shorting between loops of the constituent electrical coils. Disclosed herein are improved electromagnet components and motors employing same which are robust at the high operating temperature of the nuclear reactor.

With reference to FIGS. 2 and 3, an electromagnet includes plurality of nested freestanding electrically insulating former layers. The term "freestanding" connotes that the former layer does not collapse under its own weight, and moreover is capable of retaining its shape as electrically conductive wire is wrapped around the outside of the freestanding electrically insulating former layer to form the electromagnet as disclosed herein. The illustrative example of FIGS. 2 and 3 shows a seven-layer nest $N_{7L}$ of seven freestanding electrically insulating former layers, namely an innermost or first freestanding electrically insulating former layer FL1 nested inside a second freestanding electrically insulating former layer FL2 nested inside a third freestanding electrically insulating former layer FL3 nested inside a fourth freestanding electrically insulating former layer FL4 nested inside a fifth freestanding electrically insulating former layer FL5 nested inside a sixth freestanding electrically insulating former layer FL6 nested inside a seventh freestanding electrically insulating former layer FL7. The electromagnet is formed by wrapping electrically conductive wire around the outsides of the freestanding electrically insulating former layers to form a multilayer electrical coil that when electrically energized generates a magnetic field inside the electrical coil.

Figure 4:
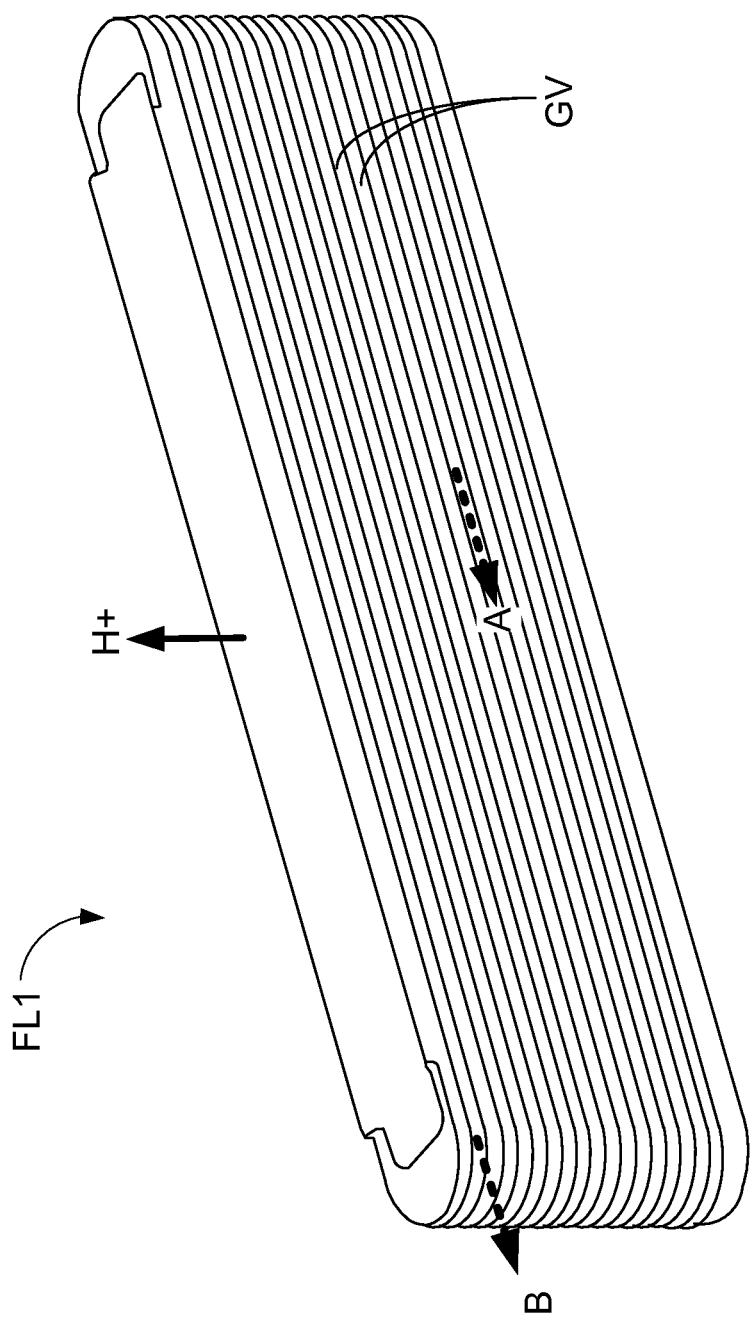
Figure 5:
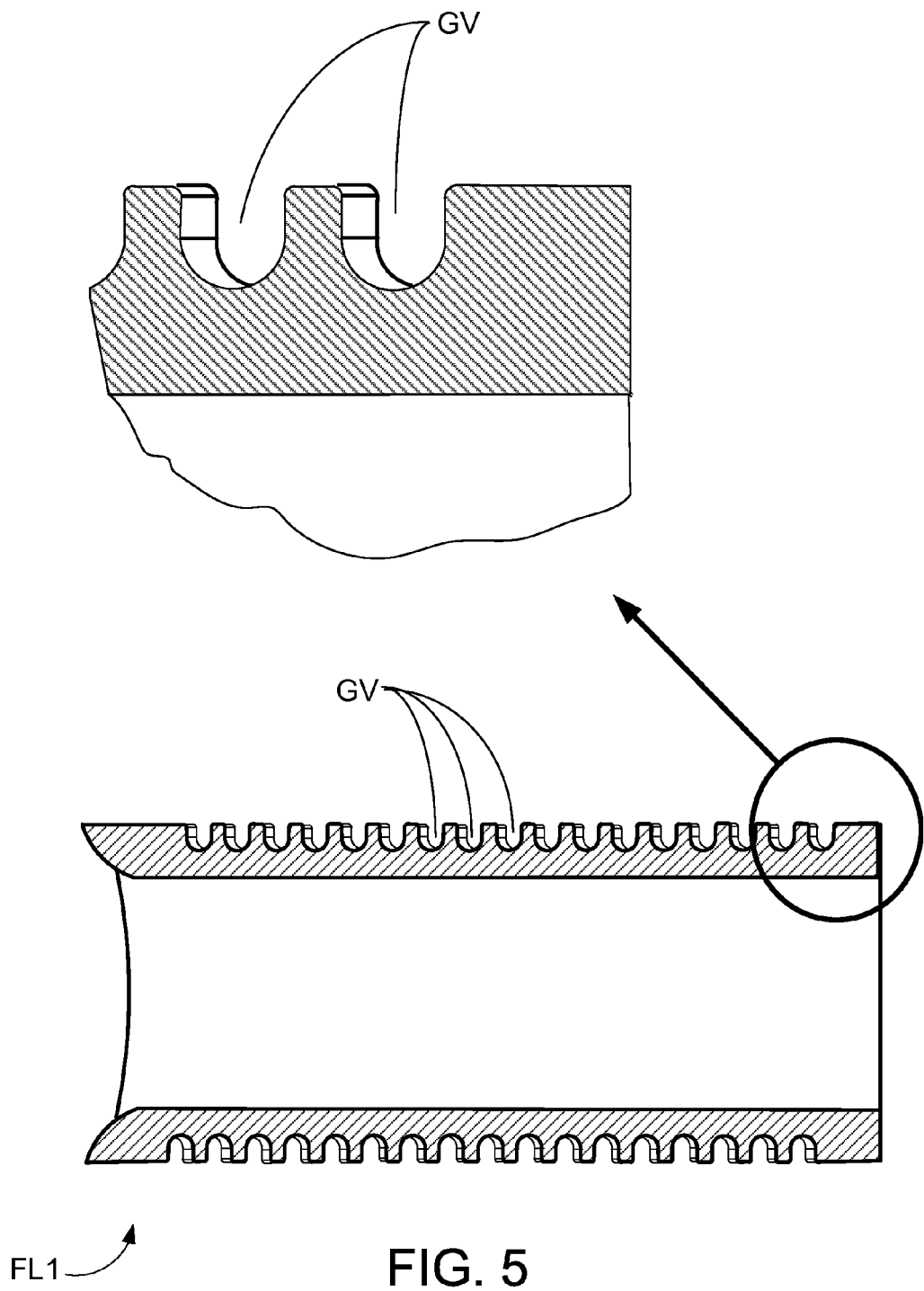
Figure 6:
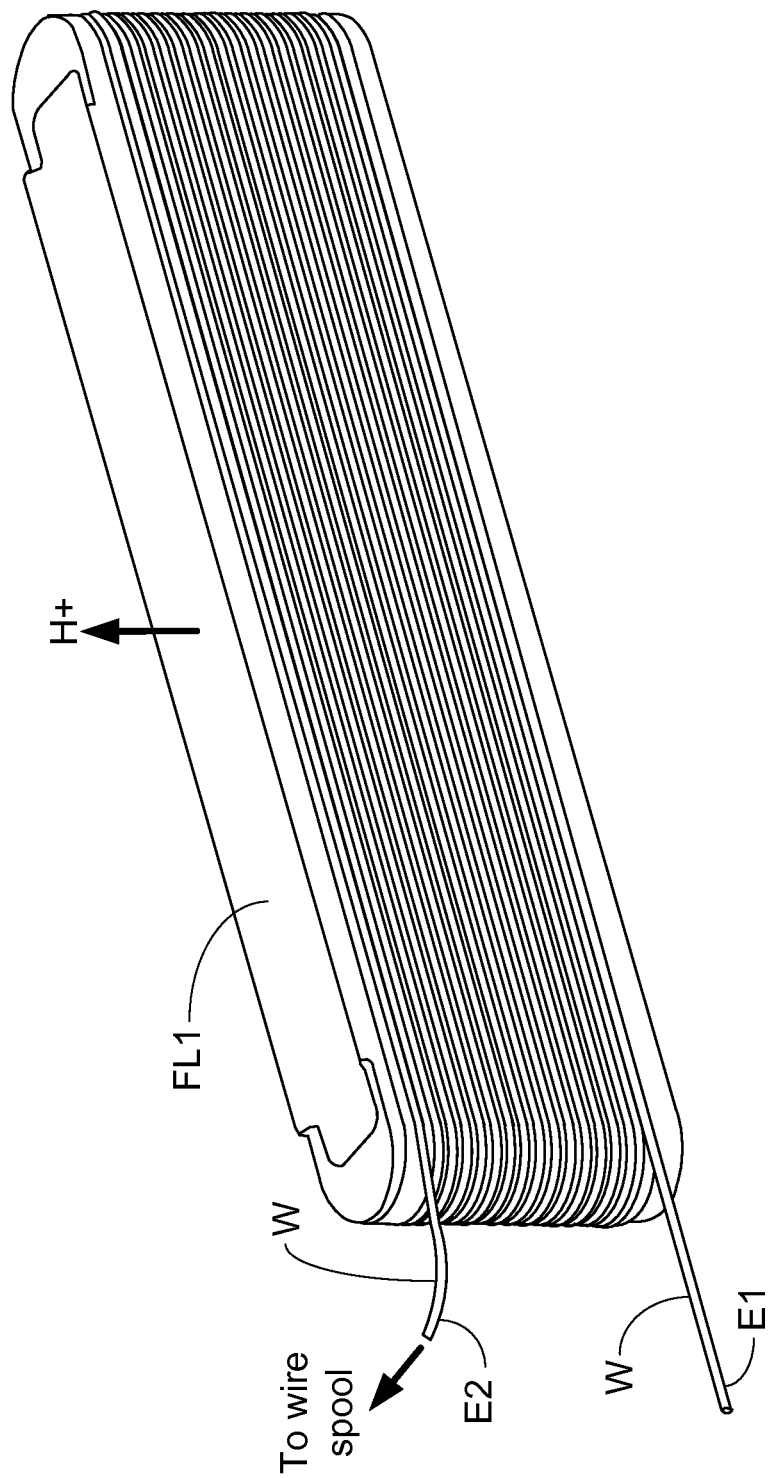

With reference to FIGS. 4-6, the wrapping of wire around the outside of the first freestanding electrically insulating former layer FL1 is described. FIG. 4 shows a perspective view of the first freestanding electrically insulating former layer FL1, FIG. 5 shows a sectional end view of the first freestanding electrically insulating former layer FL1, and FIG. 6 shows the perspective view of the first freestanding electrically insulating former layer FL1 shown in FIG. 4, but with electrically conductive wire W wrapped around the outside of it. The wire W wrapped around any given freestanding electrically insulating former layer defines a layer of the multilayer electrical coil. Within that layer, the wire is wrapped in a helical pattern in which the helical turns are spaced apart to avoid electrical arcing or shorting between neighboring helical turns. Said another way, the helical pattern has a helical pitch selected to be effective to avoid electrical arcing or shorting across neighboring helical turns for a range of interest of the electrical energizing. The spacing between neighboring helical turns is relied upon to avoid arcing or shorting, rather than relying upon an insulation of the wire. Accordingly, the electrically conductive wire is suitably (although not necessarily) bare electrically conductive wire not having electrical insulation. In some embodiments, the electrically conductive wire is bare copper wire not having electrical insulation. In some embodiments, the electrically conductive wire is bare silver wire not having electrical insulation. The minimum spacing between helical turns that is effective for avoiding arcing or shorting is readily ascertained based on the voltage across turns (which can be estimated, for example, as V/N where V is the applied voltage across the coil and N is the number of turns) and knowledge of breakdown voltage characteristics of the ambient in which the electrical coil resides. The minimum spacing may also be affected by other parameters such as the detailed shape of the helical turns. Any spacing larger than the minimum spacing effective for avoiding arcing or shorting is also suitable.

In some embodiments, the freestanding electrically insulating former layer has a smooth outside surface and the wire is wrapped around the freestanding electrically insulating former layer in the helical pattern with sufficient tightness that friction retains the helical turns in their initial positions so as to avoid movement and possible consequent arcing or shorting between neighboring helical turns.

However, with particular reference to FIGS. 4 and 5, in the illustrative embodiment a helical groove GV is formed in the outside surface of the freestanding electrically insulating former layer FL1 to retain the wire W in the desired helical pattern with the desired spacing between helical turns. As best seen in the inset of FIG. 5, the illustrative groove GV has a hemispherical profile that is sized to receive the wire W (the wire W in this embodiment is assumed to have a circular cross-section). Although the groove GV is shown in detail and labeled only for the first freestanding electrically insulating former layer FL1, it is to be understood that in the illustrative embodiment each of the seven freestanding electrically insulating former layers FL1, FL2, FL3, FL4, FL5, FL6, FL7 includes such a helical groove for defining the helical pattern of the helically wound electrically conducting wire W.

The helical pitch or spacing between neighboring helical turns of the electrically conductive wire W ensures that arcing or shorting does not occur between neighboring turns within a layer of the multilayer electrical coil. On the other hand, the nest $N_{7L}$ ensures that there is a freestanding electrically insulating former layer disposed between any two neighboring layers of the multilayer electrical coil. The intervening freestanding electrically insulating former layer is of a material and thickness (taking into account any thickness reduction due to the helical groove GV) effective for avoiding arcing or shorting. Again, the minimum thickness and material is readily ascertained based on the voltage between layers (which can be estimated, for example, as $V/N_L$ where L is the number of layers in the multilayer coil, e.g. L=7 for the illustrative nest $N_{7L}$, and V is the applied voltage across the coil) and knowledge of breakdown voltage characteristics of the material comprising the intervening freestanding electrically insulating former layer, and knowledge of the thickness of the freestanding electrically insulating former layer. Typically, the voltage is a design parameter, the number of layers is selected early in the design based on the magnetic field strength to be generated and the applied voltage specification, and the minimum thickness of the freestanding electrically insulating former layer effective for avoiding arcing or shorting is then estimated. Any thickness larger than the minimum thickness effective for avoiding arcing or shorting is also suitable.

As already noted, in estimating the minimum thickness any thickness reduction due to the helical groove GV should be taken into account. However, in doing so it is contemplated to arrange the helical groove on neighboring freestanding electrically insulating former layers to provide some additional "lateral" spacing to aid in preventing arcing or shorting between layers. For example, by offsetting the helical patterns of neighboring layers by one-half of the helical pitch additional nearest-neighbor spatial separation is achieved.

The outermost freestanding electrically insulating former layer, namely the seventh freestanding electrically insulating former layer FL7 in the illustrative seven-layer nest $N_{7L}$, has wire wrapped on its outside to form the outermost layer of the multilayer electrical coil. This outermost coil layer has only one neighboring coil layer, namely the sixth coil layer wrapped on the outside of the next-inward freestanding electrically insulating former layer FL6. Thus, there is no need for an electrically insulating layer outward of the outermost coil layer in order to prevent outward arcing or shorting to a more outer neighboring coil layer (since none exists). However, depending upon the application it may be undesirable to leave the outermost coil layer exposed, since it could contact some other component and thus create an electrical hazard. To prevent such an occurrence, in the illustrative example (see FIGS. 2 and 3) a capping freestanding electrically insulating layer CL is disposed around the plurality of nested freestanding electrically insulating former layers, that is, around the nest $N_{7L}$. The purpose of this cap layer CL is to prevent contact with the outermost coil layer.

It should be noted that the use of the term "helical pitch" herein does not require that the helical pattern have a uniform helical pitch over the entire helical pattern. In some electromagnet designs it may be advantageous to use a smaller pitch in certain areas to increase the local electrical field and/or a larger pitch in certain areas to reduce the local electrical field, and such variations are contemplated. Similar considerations may lead to a design in which the freestanding electrically insulating former layer has variable thickness. In such cases, the "local" helical pitch and "local" thickness should be everywhere sufficient to prevent arcing or shorting between nearest-neighbor (both in-layer and interlayer) helical turns.

As already noted, each freestanding electrically insulating former layer should have the mechanical property of not collapsing under its own weight and being capable of retaining its shape as electrically conductive wire is wrapped around its outside. As further already noted, each freestanding electrically insulating former layer should also have dielectric properties (in combination with sufficient thickness) to prevent electrical arcing or shorting across layers of the multilayer electrical coil for a range of interest of the electrical energizing (for example, as specified by a maximum applied voltage). Still further, the each freestanding electrically insulating former layer should be electrically insulating, meaning that its electrical conductivity is sufficiently low that electrical conduction through the former layer is negligible (for example, as defined by an acceptable "leakage current" across the former layer which may in some embodiments be below the measurable limit) for the range of interest of the electrical energizing. Another material constraint is that the material of the freestanding electrically insulating former layers should be sufficiently heat resistant to avoid problematic degradation at operating temperature (which, by way of illustrative example, in some nuclear reactor applications may be at least 300° C., and in some nuclear reactor applications may be at least 350° C.). For suitable ceramic, metallic, or other selected materials, the wrapped former layers are expected to be operative at temperatures well above 500° C.

Based on these considerations, various materials can be identified as suitable for use as the electrically insulating former layers. In some embodiments, the freestanding electrically insulating former layers comprise a ceramic material. In some embodiments, the freestanding electrically insulating former layers comprise a zirconia toughened alumina (ZTA) material. Various other materials with the requisite mechanical, electrical, and thermal resistance properties are also contemplated. The optional capping freestanding electrically insulating layer CL is suitably made of the same material as the electrically insulating former layers, although it could be made of a different (but still electrically insulating and thermally resistant) material. If made of a different material, in some such embodiments the cap layer CL is not freestanding.

The pattern of the winding of the electrically conductive wire W on the freestanding electrically insulating former layers FL1, FL2, FL3, FL4, FL5, FL6, FL7 of the nest $N_{7L}$ is such that the electrically conductive wire W is wrapped around the outside of each freestanding electrically insulating former layer to form a helical wrapped wire layer in a helical pattern oriented such that the contributions to the magnetic field inside the multilayer electrical coil from the helical wrapped wire layers around the outsides of all freestanding electrically insulating former layers of the nest $N_{7L}$ are additive. In some embodiments, each of the freestanding electrically insulating former layers is wrapped with a separate wire, so that, for example, in the case of the seven-layer nest $N_{7L}$ there would be fourteen terminal wires (two for each layer), and these terminal wires can be externally interconnected and/or connected with voltage sources to apply voltage of the desired polarity to each layer so as to additively combine the generated magnetic fields inside the multilayer electric coil. However, this approach has the disadvantage of entailing a substantial amount of external wiring and concomitant external components.

In the illustrative example, the electrically conductive wire W comprises a single electrically conductive wire W that is wrapped around all seven freestanding electrically insulating former layers FL1, FL2, FL3, FL4, FL5, FL6, FL7 of the nest $N_{7L}$. To make this work, the wrapping pattern should satisfy the additional constraint that once one layer is wrapped the wire is conveniently extended onto the next layer of the nest $N_{7L}$.

Figure 7:
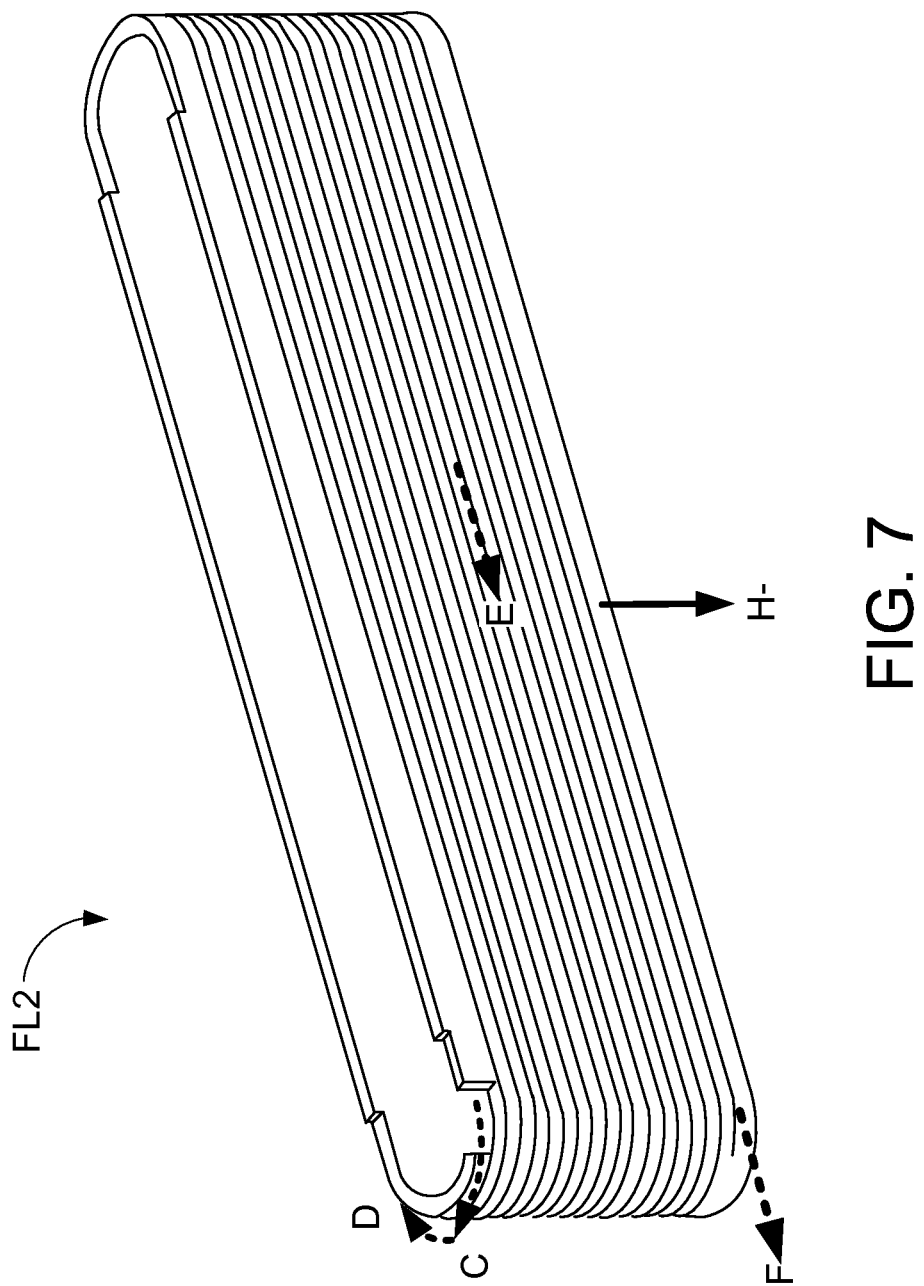
Figure 8:
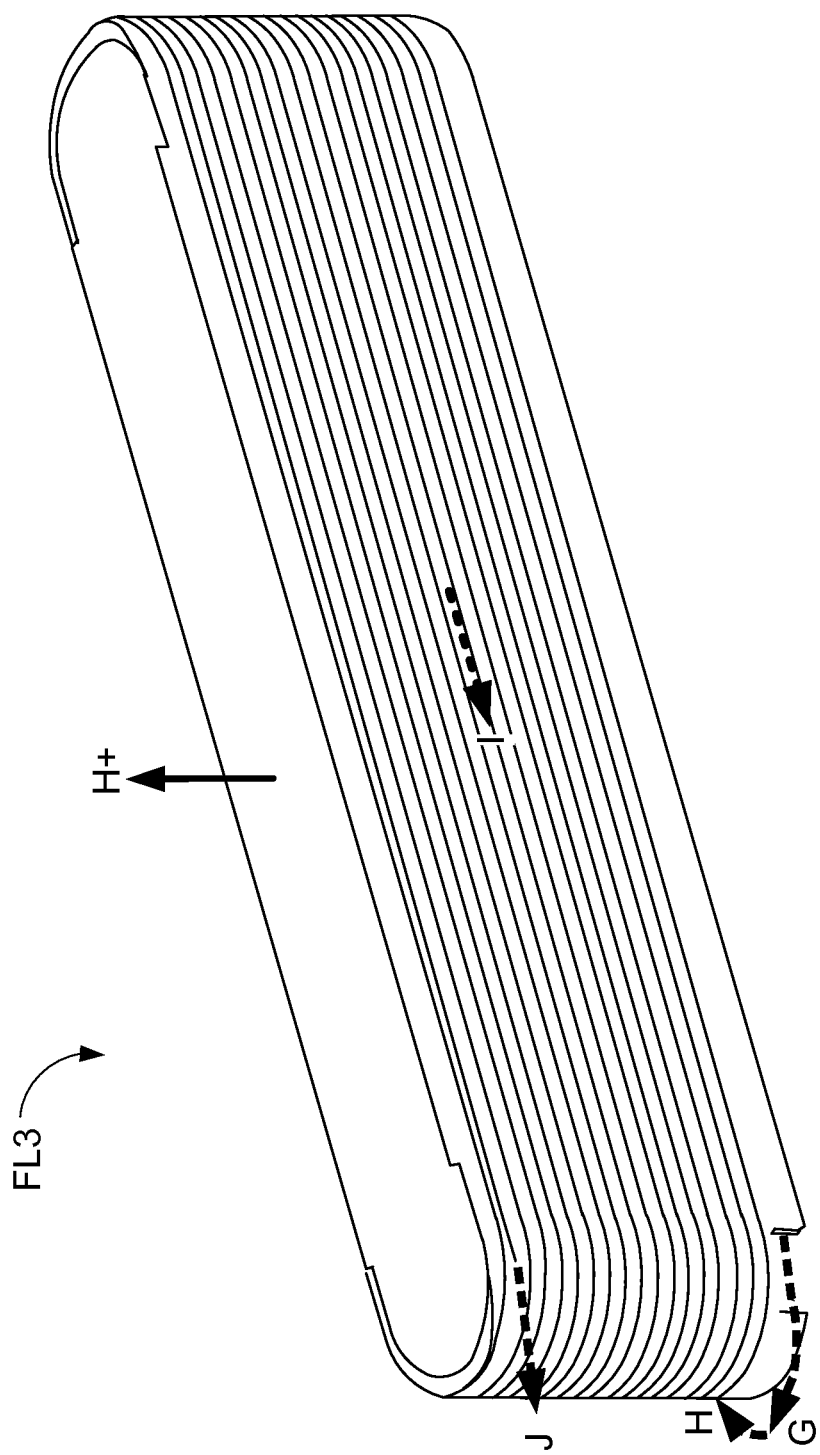

With reference to FIG. 4 and further reference to FIGS. 7 and 8 (showing perspective views of the second and third former layers FL2, FL3, respectively), a suitable continuous wrapping approach is described for continuously wrapping the single wire W onto multiple former layers of the nest $N_{7L}$ to generate additively combining magnetic field contributions inside the multilayer coil. The wrapping is described with reference to wrapping "points" A, B, C, D, E, F, G, H, I, J which are diagrammatically indicated in FIGS. 4, 7, and 8 by dashed arrows. The wrapping points A, B shown in FIG. 4 depict a suitable wrapping of the first freestanding electrically insulating former layer FL1. This wrapping is suitably accomplished by wrapping the outside of the first freestanding electrically insulating former layer FL1 of the nest $N_{7L}$ in a helical pattern from a first end to an opposite second end (that is, in the direction H+ indicated by an arrow in FIG. 4). The wrapping point A is during the wrapping of the former layer FL1, while the wrapping point B is at the point when the first former layer FL1 is completely wrapped.

FIG. 6 shows the fully wrapped first former layer FL1. At this point in the wrapping process, there is a dangling end E1, and an "end" E2 which actually goes to the wire spool (not shown) from which the electrically conductive wire W is being unwound. It is also noted that while the description here is in terms of the wire W being wound around the apparently stationary former layer FL1, in some embodiments the winding is performed by rotating the former layer FL1 while keeping the wire spool fixed.

With particular reference to FIG. 7, the wire wrapping continues onto the next (second, in this instance) freestanding electrically insulating former layer FL2. The wrapping continues onto the second end of the adjacent freestanding electrically insulating former layer FL2 of the nest $N_{7L}$, and is wrapped on the outside of the adjacent freestanding electrically insulating former layer FL2 in a helical pattern from the second end to the first end, that is, in the direction H– indicated in FIG. 7 which is opposite the direction H+ of wrapping of first former layer FL1 (cf. FIG. 4). The wrapping of second former layer FL2 is diagrammatically indicated in FIG. 7 by wrapping points C, D showing the transition from wrapping the first former layer FL1 to wrapping the second former layer FL2, point E denoting the wrapping of the former layer FL2 in the direction H–, and the "end" point F at which point the second former layer FL2 is fully wrapped. Notice that at this point F the end of the wire (which, again, actually continues on to the unillustrated wire spool from which the wire W is being fed) is back at the first end of the nest.

With particular reference to FIG. 8, the wire wrapping continues onto the next (third, in this instance) freestanding electrically insulating former layer FL3. The wrapping continues onto the first end of the adjacent freestanding electrically insulating former layer FL3 of the nest $N_{7L}$, and is wrapped on the outside of the adjacent freestanding electrically insulating former layer FL3 in a helical pattern from the first end to the second end, that is, in the direction H+ indicated in FIG. 7 which is opposite the direction H– of wrapping of immediately previous (i.e., second) former layer FL2 (cf. FIGS. 7 and 8). The wrapping of third former layer FL3 is diagrammatically indicated in FIG. 8 by wrapping points G, H showing the transition from wrapping the second former layer FL2 to wrapping the third former layer FL3, point I denoting the wrapping of the former layer FL3 in the direction H+, and the "end" point J at which point the third former layer FL3 is fully wrapped.

This wrapping process continues on for each successive former layer until all seven former layers FL1, FL2, FL3, FL4, FL5, FL6, FL7 of the nest $N_{7L}$ are wrapped by the single wire W.

Figure 9:
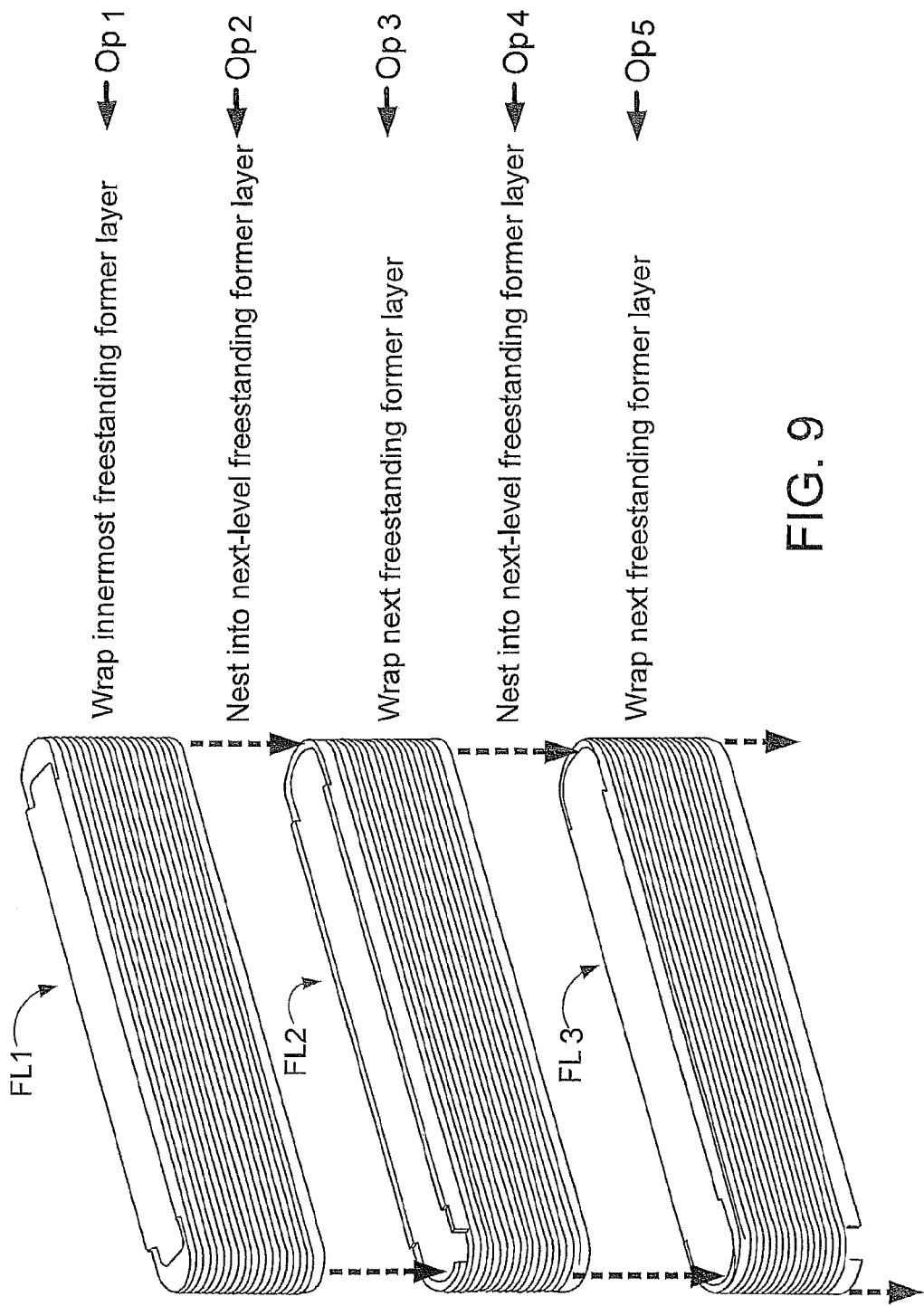

With reference to FIG. 9, the nesting process is also performed during the wrapping. Thus, in an operation Op1 the first former layer FL1 is wrapped as described with reference to FIGS. 4 and 6. Once this first wrapping operation Op1 is completed, the first former layer FL1 (including the wrapped wire) is nested inside the next (i.e., second) former layer FL2 in an operation Op2. The second former layer FL2 (with the first former layer FL1 nested therein) is then wrapped as described with reference to FIG. 7 in an operation Op3. Once this second wrapping operation Op3 is completed, the second former layer FL1 (including the wrapped wire and with the first former layer FL1 nested inside) is nested inside the next (i.e., third) former layer FL3 in an operation Op4. The third former layer FL3 (with the first and second former layers FL1, FL2 nested therein) is then wrapped as described with reference to FIG. 8 in an operation Op5. The nesting and wrapping operations are repeated until all seven former layers FL1, FL2, FL3, FL4, FL5, FL6, FL7 of the nest $N_{7L}$ are wrapped by the single wire W.

In the nesting operations, e.g. the operations Op2, Op4 in illustrative FIG. 9, various approaches can be used to position and hold the inner freestanding electrically insulating former layer in the next-outer freestanding electrically insulating former layer (e.g., to hold former layer FL1 nested inside former layer FL2 in nesting operation Op2; to hold former layer FL2 nested inside former layer FL3 in nesting operation Op4; and so forth). In some embodiments, the fitting is close enough to be compressively held. Optionally, the wrapped wire around the inner former layer serves as a compressive "O-ring" type coupling for assisting this compressive fit. In other embodiments (not illustrated), the former layers include mating elements, such as matched slots and protrusions or the like, to position and/or hold the inner former layer inside the next-outer former layer. Adhesives are also contemplated; however, the adhesive must remain operative at the high temperature or in other extreme conditions if the resulting electromagnet is to be operated at high temperature or in other extreme conditions. It is also contemplated to use a frame or the like to support the nest during the wrapping/nesting process and to then employ an external element such as a clamp or the like to secure the final nested assembly together in the final electromagnet.

In transitioning the wire wrapping between former layers, as in going from the end of the wrapping operation Op1 to the start of the next wrapping operation Op3, or in going from the end of the wrapping operation Op3 to the start of the next wrapping operation Op5, or so forth, each such transition entails moving the wire "outward" to match the slightly larger diameter of the next former layer in the nest. Optionally, each former layer (except the last former layer FL7) includes a ramping structure at the "outlet" (that is, proximate to the wrapping point B in the case of the first former layer FL1; proximate to the wrapping point F in the case of the second former layer FL1; proximate to the wrapping point J in the case of the third former layer FL3; and so forth) that biases the wire outward. Similarly, each former layer (except the first former layer FL1) optionally includes a slot or other structure at the "inlet" (that is, proximate to the wrapping point C in the case of the second former layer FL1; proximate to the wrapping point G in the case of the third former layer FL3; and so forth) that facilitates receiving the wire onto the former layer to initiate the wrapping of that former layer.

Figure 10:
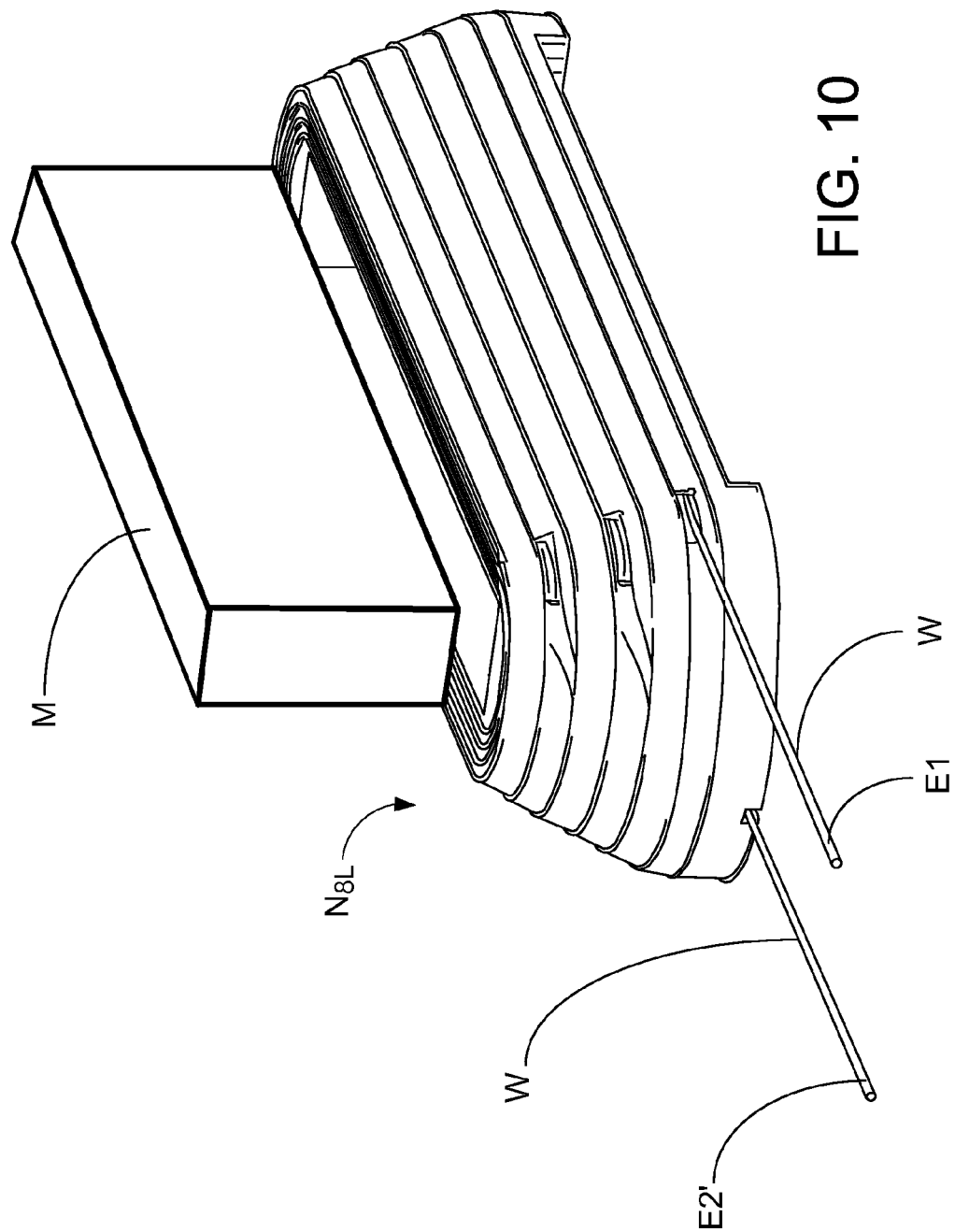
Figure 11:
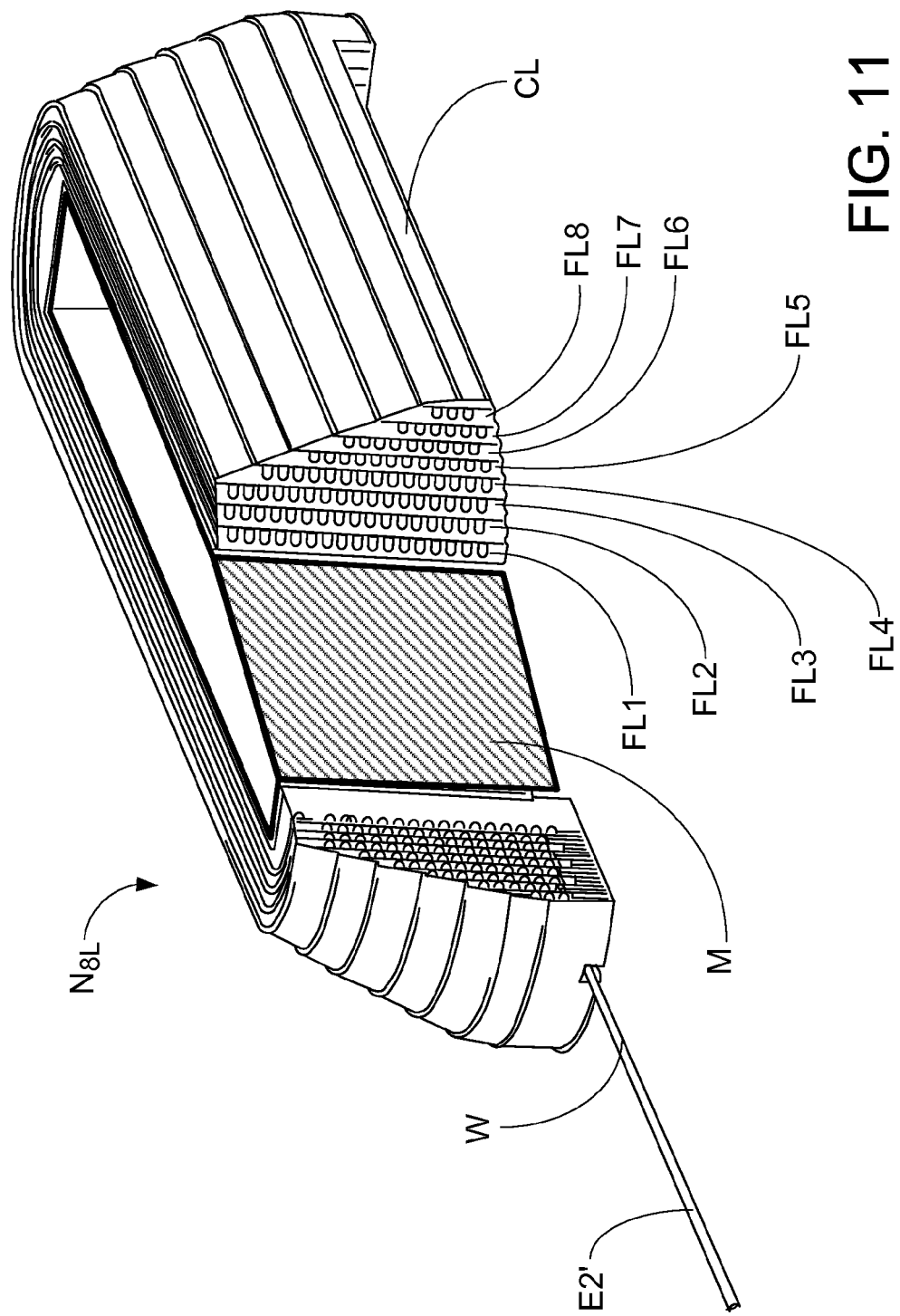

With reference to FIGS. 10 and 11, the final result of the single-wire wrapping process described with reference to FIGS. 4 and 6-9 is a multi-layer nest of freestanding electrically insulating former layers with wire wrapped around the former layers. FIG. 10 illustrates that the number of former layers is a design parameter by illustrating a variant nest $N_{8L}$ which includes the seven freestanding electrically insulating former layers FL1, FL2, FL3, FL4, FL5, FL6, FL7 and further includes an eighth freestanding electrically insulating former layer FL8, which is capped by the capping layer CL. The final electromagnet includes the first end E2' corresponding to the final end wire after wrapping the outermost freestanding electrically insulating former layer FL8 and cutting the wire off of the supply wire spool (not shown). While illustrative examples with seven or eight former layers are shown by way of illustrative example, it is to be understood that the number of layers is a design parameter, and values as small as L=1 (a single layer, either with or without a capping layer) or L=2 (two layers, optionally with an additional capping layer) are contemplated. In similar fashion, the number of windings per layer is a design parameter for each layer (and may vary between layers) and for the electromagnet as a whole.

The resulting electromagnet includes the multilayer electrical coil defined by the coil layers disposed on the former layers. When electrically energized, this multilayer electrical coil generates a magnetic field inside the multilayer electrical coil. The illustrative former layers have an inner cavity or opening that enables the electromagnet to be an air-core magnet (or a "water core" magnet if disposed in water-based primary coolant 14). As shown in FIGS. 10 and 11, this inner cavity or opening is optionally filled with a ferromagnetic element M which substantially enhances the generated magnetic field. Optionally, the ferromagnetic element M can be inserted after the wrapping is completed—in contrast, typically an electromagnet is formed by wrapping the windings directly around the ferromagnetic core. Since the ceramic or other electrically insulating material of the former layers is typically substantially less dense than iron, steel, or other ferromagnetic material, in manufacturing embodiments employing a fixed source wire spool this advantageously enables rotating a substantially lighter weight element respective to the spool during the wrapping.

The disclosed electromagnets can be employed in any application in which an electromagnet is useful, and the disclosed electromagnets have especial application in high temperature environments, chemically caustic environments, radioactive environments, or other environments in which conventional wire insulation is likely to degrade and fail. In some embodiments, the electromagnet comprises copper or silver (for the bare wire), zirconia toughened alumina (ZTA) or another ceramic material for the freestanding electrically insulating former layers, and optionally steel or another suitable ferromagnetic material for the core. These metals, and many ceramics including ZTA, are highly resistant to high temperatures, caustic chemicals, radioactivity, and other environmental extremes. Accordingly, the disclosed electromagnets are robust for use in extreme environments such as inside the pressure vessel 12 of the illustrative nuclear reactor of FIG. 1. In general, the disclosed electromagnets can be used in any application that utilizes an electromagnet, such as in a solenoid switch or other solenoid-based device, in an electric motor or any device including an electric motor, or so forth.

Figure 12:
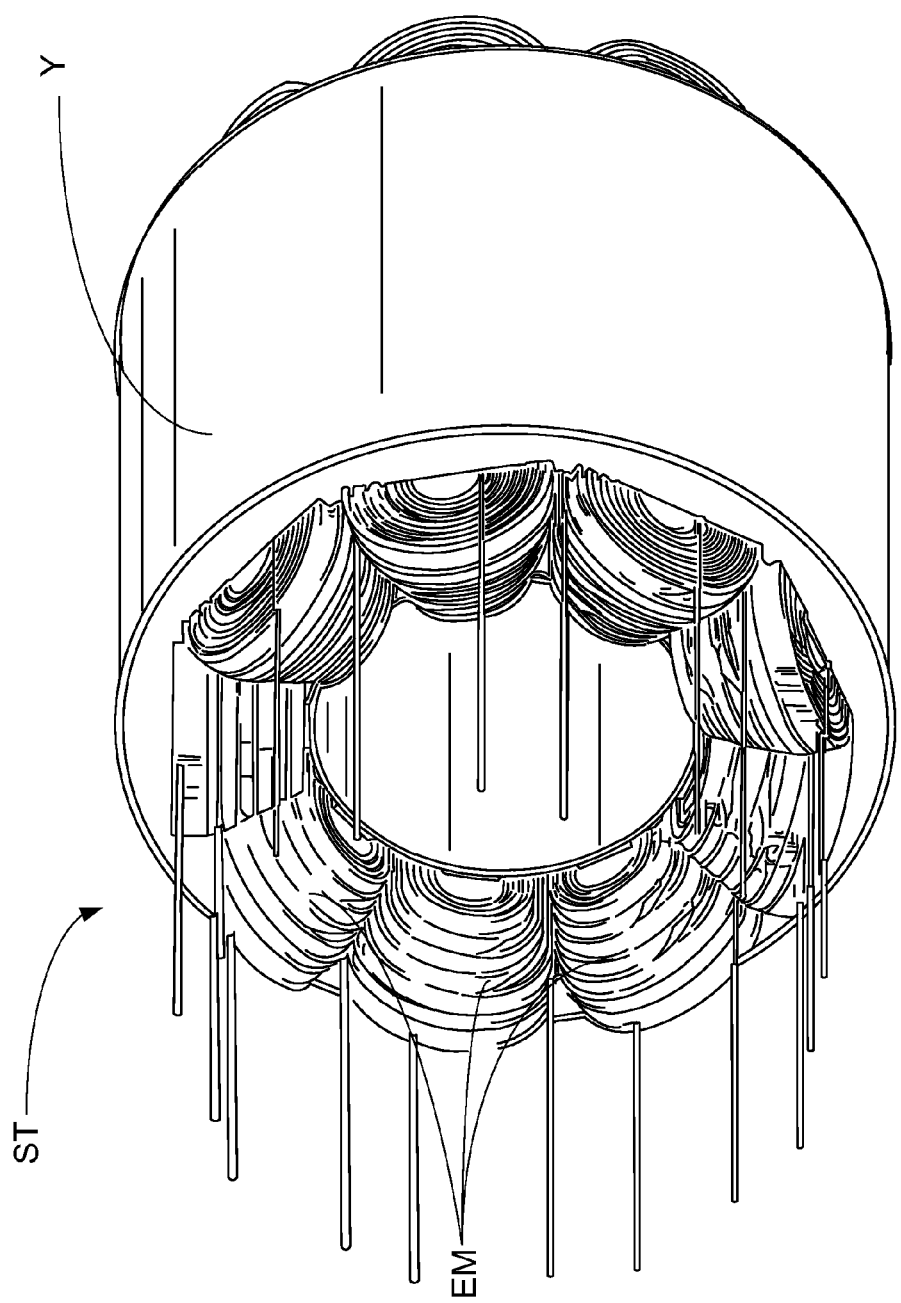
FIGS. 12-14 show embodiments of a multi-pole stator for an electric motor employing electromagnets as described with illustrative reference to FIGS. 2-11 as stator poles. Of these.
Figure 13:
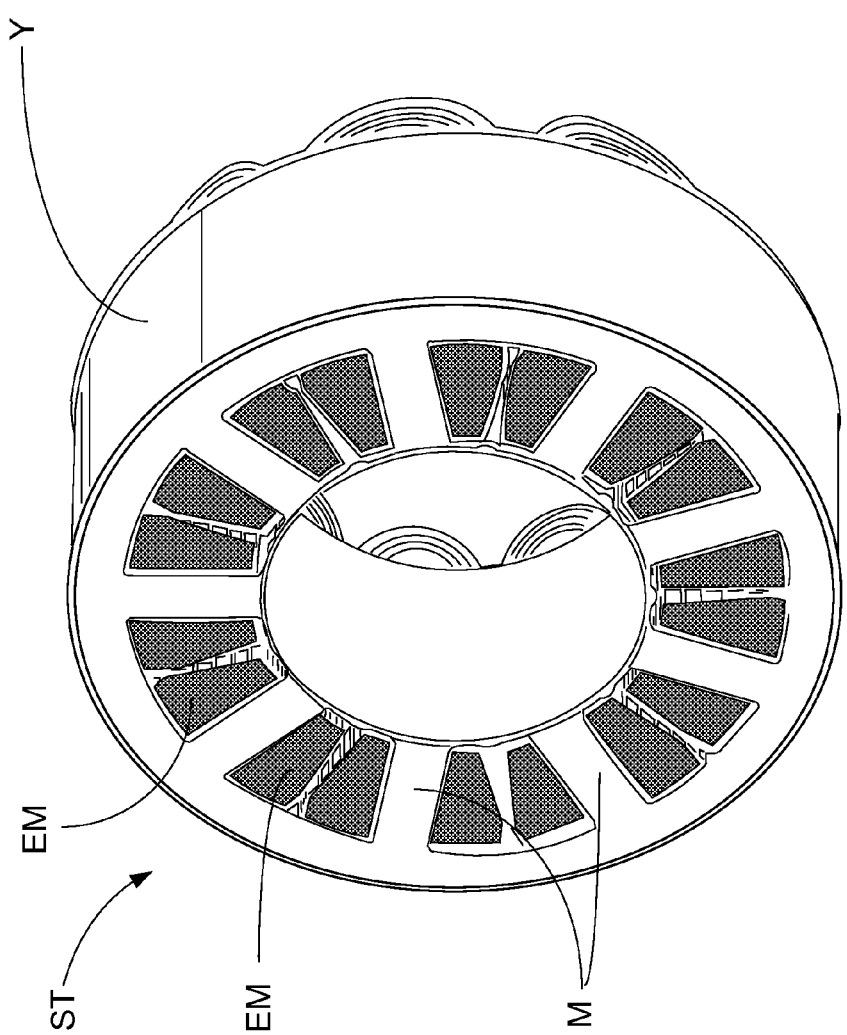
Figure 14:
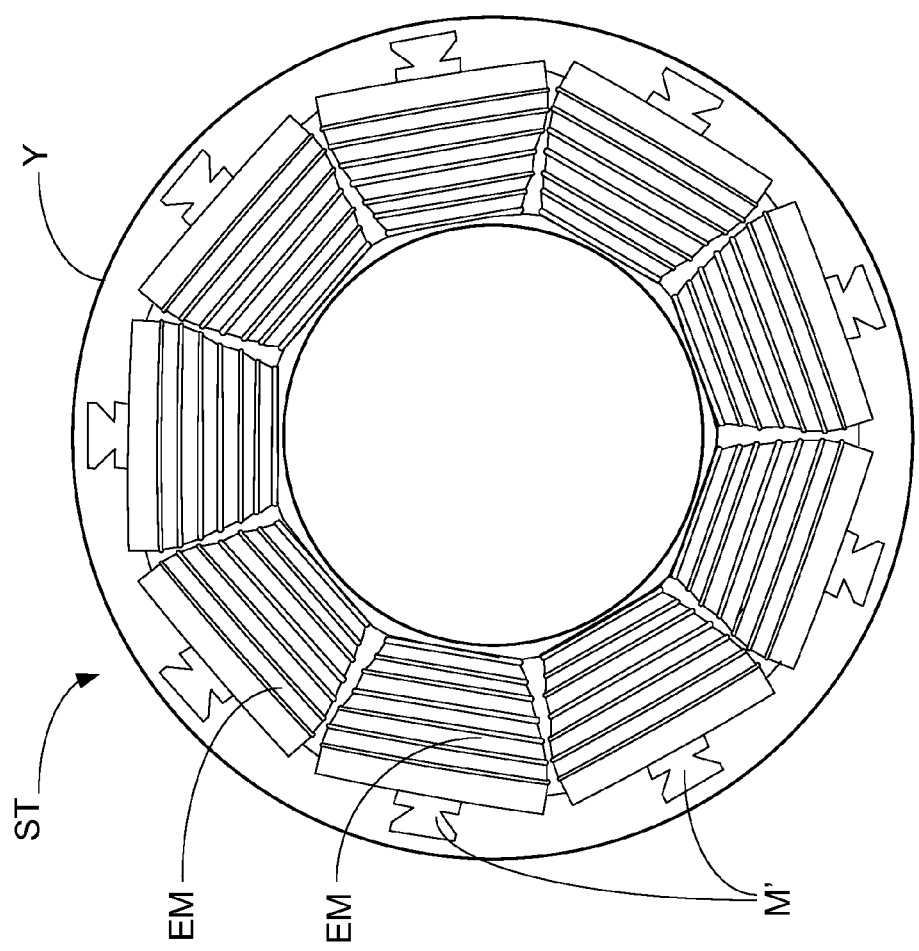

With reference to FIGS. 12-14, an illustrative multi-pole motor stator ST is shown, in which each stator pole is embodied by an electromagnet EM comprising a nest of freestanding electrically insulating former layers wrapped with wire as disclosed herein. The illustrative multi-pole motor stator ST includes nine stator poles; however, in general a motor stator having any number of stator poles may be similarly constructed.

With continuing reference to FIGS. 12-14, the illustrative multi-pole motor stator ST includes a ferromagnetic yoke Y. In the variant embodiment shown in the sectional perspective view of FIG. 13, the yoke Y includes integral ferromagnetic element M disposed inside the electrical coils of the electromagnets EM. In the variant embodiment shown in the end view of FIG. 14, ferromagnetic element M' disposed inside the electrical coils of the electromagnets EM include dovetail fittings that mount onto mating slots of the ferromagnetic yoke Y. The latter design of FIG. 14 can be convenient from a manufacturing standpoint, since the manufacturing can be broken into three parts: (1) wrapping and nesting the freestanding electrically insulating former layers to form the electrical coil; (2) inserting the ferromagnetic elements M' into the respective electrical coils to form individual ferromagnetic core-based electromagnets; and (3) installing the individual ferromagnetic core-based electromagnets onto the yoke Y using the dovetail mount fittings.

As seen in FIGS. 12-14, the nest of former layers defining the electromagnets EM has a wedge shape that enables the nine electromagnets EM to be fitted closely together to form the circumferential arrangement of the nine-pole stator ST. Review of FIGS. 3, 10, and 11 shows that this wedge shape is suitably attained by gradually reducing the height in the H+ (or, equivalently here, H−) direction of the successively more outer former layers FL1, FL2, FL3, FL4, FL5, FL6, FL7 and, optionally, FL8. In similar fashion other electromagnet geometries can be achieved using suitably shaped freestanding electrically insulating former layers. For example, an elongated cylindrical solenoid can be formed using cylindrical former layers.

Figure 16:
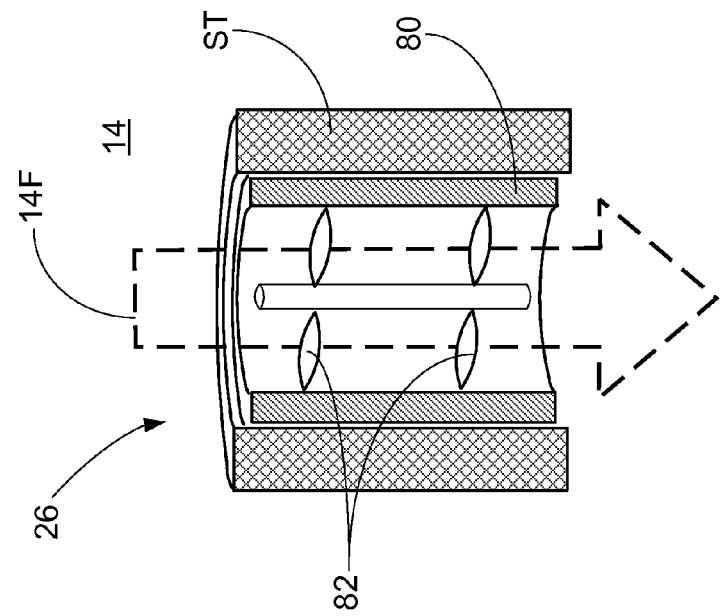
FIG. 16 diagrammatically shows a side sectional view of a suitable embodiment of a coolant pump of the PWR nuclear power system of FIG. 1, in which the coolant pump includes an electric motor with a multi-pole stator described with illustrative reference to FIGS. 12-14.
Figure 15:
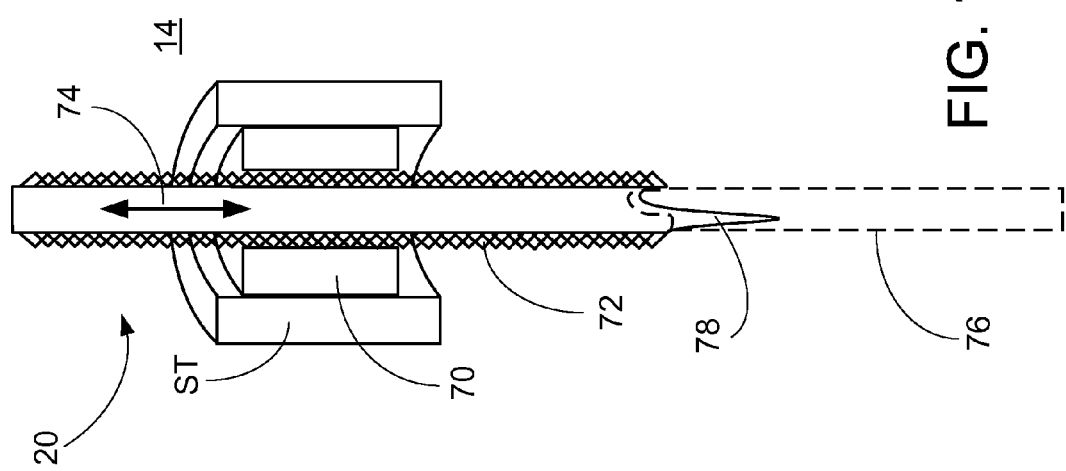
FIG. 15 diagrammatically shows a side sectional view of a suitable embodiment of a control rod drive mechanism (CRDM) and coupled control rod of the PWR nuclear power system of FIG. 1, in which the CRDM includes an electric motor with a multi-pole stator described with illustrative reference to FIGS. 12-14.

With reference to FIGS. 15 and 16, the illustrative multi-pole stator ST can be used in various devices that employ an electric motor. By way of illustrative example, FIG. 15 shows a suitable embodiment of the CRDM 20 of the nuclear reactor of FIG. 1, while FIG. 16 shows a suitable embodiment of the coolant pump 26 of the nuclear reactor of FIG. 1. As already described, both devices 20, 26 are submerged in the primary coolant 14 and operate with the primary coolant 14 at an elevated operating temperature of at least 300° C. in some embodiments, and at least 350° C. in some embodiments.

With particular reference to FIG. 15, in the illustrative CRDM 20 the stator ST is mounted in a rotationally and translationally fixed position, and rotates a rotor 70 that is coupled by a threaded connection with a lead screw 72. The lead screw 72 is prevented from rotating by a suitable mechanical stop (not shown), but can translate up/down in a translation direction 74. The combined effect is that as th e multi-pole stator ST interacts with the rotor 70 to cause it to rotate, the rotor causes the lead screw 72 to translate up or down along the translation direction 74. Downward motion of the lead screw 72 is achieved by rotating the rotor 70 in one direction (e.g., clockwise) while upward motion of the lead screw 72 is achieved by rotating the rotor 70 in the opposite direction (e.g., counterclockwise). A control rod 76 (shown in phantom in FIG. 15) contains a neutron-absorbing material. The control rod 76 is connected with the lead screw 72 by a direct or indirect coupling 78 (diagrammatically indicated in FIG. 15). In some embodiments, the direct or indirect coupling 78 is via a spider or other coupling element or assembly that enables a plurality of control rods to be connected with the same lead screw 72. In this way, operation of the electric motor comprising the stator ST and rotor 70 drives the control rod 76 upward (that is, out of the reactor core 10) or downward (that is into the reactor core 10).

The electric motor comprising the stator ST and the rotor 70 can be substantially any type of electric motor, such as a salient pole motor, a permanent magnet brushless DC motor, or so forth. The specific electric motor implemented depends upon the number and arrangement of stator electromagnets, and the type of rotor. For gray rod control in which the amount of insertion of the control rod 76 into the reactor core 10 is intended to be continuously (or quasi-continuously) adjustable, the electric motor comprising the stator ST and the rotor 70 suitably operates as a stepper motor to enable precise positioning of the control rod 76 along the translation direction 74. Although not illustrated, it should be noted that in some types of motors the rotor includes an electromagnet which may also be embodied by a multilayer electrical coil supported by a nest of freestanding electrically insulating former layers as disclosed herein.

The control rod system can include various modification that are not illustrated. For example, in some embodiments the threaded connection between the lead screw 72 and the rotor 70 is in the form of a separable ball-nut which can separate to allow the assembly including the lead screw 72, coupling 78 (e.g., spider), and the control rod 76 to fall rapidly under the force of gravity toward the reactor core 10. Such a rapid release is advantageously during a loss of coolant accident (LOCA) or other emergency event in which the reactivity of the core 10 is to be rapidly extinguished.

With particular reference to FIG. 16, in the illustrative coolant pump 26 the stator ST is mounted in a rotationally and translationally fixed position, and rotates a rotor 80. An impeller 82 connected with the rotor 80 so that the impeller 82 rotates with the rotor 80 to drive a primary coolant flow 14F (diagrammatically indicated by a large arrow drawn in phantom in FIG. 16). For coolant pumps 26 positioned in the outer annulus as shown in the illustrative reactor example of FIG. 1, this downward coolant flow 14F driven (or assisted) by the coolant pump 26 promotes the desired circulation of primary coolant in the pressure vessel 12 as described elsewhere herein with reference to FIG. 1. For the pump application of FIG. 16, the electric motor comprising the stator ST and the rotor 80 is typically a continuously operating motor that drives the impeller 82 at a continuous rotational rate selected to generate a desired magnitude of the primary coolant flow 14F.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
  an electric motor including a rotor and a circumferential stator, the stator having a circumferential inner perimeter and a circumferential outer perimeter;
  a plurality of electromagnets, each electromagnet having a bottom end, a top end, a central axis extending therebetween, a first width at its top end that is less than a second width at its bottom end, the first width and the second width being taken in a direction perpendicular to the central axis, the electromagnet comprising:
    a plurality of nested freestanding electrically insulating former layers, each of the freestanding electrically insulating former layers having a height in a direction parallel to the central axis; and
  electrically conductive wire wrapped around the outsides of the freestanding electrically insulating former layers to define a multilayer electrical coil in which adjacent layers of the multilayer electrical coil are spaced apart by intervening freestanding electrically insulating former layers, each layer of the multilayer electrical coil being wrapped around the outside of a corresponding one of the freestanding electrically insulating former layers that is slidably received within an adjacent one of the freestanding electrically insulating former layers, the height of the corresponding one of the freestanding electrically insulating former layers being greater than the height of the adjacent one of the freestanding electrically insulating former layers,
  wherein electrically energizing the multilayer electrical coil generates a magnetic field inside the multilayer electrical coil, and
  wherein the plurality of electromagnets are arranged within the stator so that the top end of each electromagnet is adjacent the circumferential inner perimeter and the bottom end of each electromagnet is adjacent the circumferential outer perimeter.

2. The apparatus as set forth in claim 1, further comprising:
  a ferromagnetic core disposed inside each multilayer electrical coil.

3. The apparatus as set forth in claim 2, wherein each ferromagnetic core defines a support that supports the electromagnet comprising the plurality of nested freestanding electrically insulating former layers and the electrically conductive wire.

4. The apparatus as set forth in claim 1, wherein the electrically conductive wire is bare electrically conductive wire.

5. The apparatus as set forth in claim 1, wherein the electrically conductive wire is bare copper wire.

6. The apparatus as set forth in claim 1, wherein the electrically conductive wire is bare silver wire.

7. The apparatus as set forth in claim 1, wherein the electrically conductive wire is wrapped around the outside of each freestanding electrically insulating former layer in a helical pattern having a helical pitch effective to avoid electrical arcing or shorting across neighboring helical turns for a range of interest of the electrical energizing.

8. The apparatus as set forth in claim 1, wherein the electrically conductive wire is wrapped around the outside of each freestanding electrically insulating former layer to form a helical wrapped wire layer in a helical pattern oriented such that the contributions to the magnetic field inside the multilayer electrical coil from the helical wrapped wire layers around the outsides of all freestanding electrically insulating former layers of the nest are additive.

9. The apparatus as set forth in claim 8, wherein the helical wrapped wire layer around the outside of each freestanding electrically insulating former layer is wrapped with a helix axis direction opposite the helix axis direction of the helical wrapped wire layers of the one or two neighboring freestanding electrically insulating former layers of the nest.

10. The apparatus as set forth in claim 1, wherein each freestanding electrically insulating former layer includes a helical groove defined around the outside of the electrically insulating former layer and the electrically conductive wire is wrapped around the outside of the freestanding electrically insulating former layer in a helical pattern with spaced apart helical turns and is retained by the helical groove.

11. The apparatus as set forth in claim 1, wherein:
the electrically conductive wire is bare electrically conductive wire; and
each freestanding electrically insulating former layer includes a helical groove defined around the outside of the electrically insulating former layer that retains the bare electrically conductive wire wrapped around the outside of the freestanding electrically insulating former layer in a helical pattern comprising spaced apart helical turns of the bare electrically conductive wire.

12. The apparatus as set forth in claim 1, wherein:
each freestanding electrically insulating former layer includes a helical groove defined around the outside of the electrically insulating former layer that retains the bare electrically conductive wire wrapped around the outside of the freestanding electrically insulating former layer in a helical pattern comprising spaced apart helical turns of the bare electrically conductive wire; and
the electrically conductive wire comprises a single electrically conductive wire that:
is wrapped on the outside of a first freestanding electrically insulating former layer of the nest in a helical pattern from a first end to an opposite second end, continues onto the second end of an adjacent freestanding electrically insulating former layer of the nest, and
is wrapped on the outside of the adjacent freestanding electrically insulating former layer in a helical pattern from the second end to the first end.

13. The apparatus as set forth in claim 1, wherein the freestanding electrically insulating former layers comprise a ceramic material.

14. The apparatus as set forth in claim 1, wherein the freestanding electrically insulating former layers comprise a zirconia toughened alumina (ZTA) material.

15. The apparatus as set forth in claim 1, wherein each electromagnet further comprises:
a capping freestanding electrically insulating layer disposed around the plurality of nested freestanding electrically insulating former layers.

16. The apparatus as set forth in claim 1, wherein the stator of the electric motor further comprises a ferromagnetic yoke including a plurality of ferromagnetic poles corresponding to the plurality of electromagnets, with each ferromagnetic pole disposed inside the multilayer electrical coil of a corresponding electromagnet to define a stator pole of the multi-pole stator.

17. The apparatus as set forth in claim 16, wherein the ferromagnetic yoke defines a support frame of the multi-pole stator and the electromagnets are mounted on corresponding ferromagnetic poles of the ferromagnetic yoke.

18. The apparatus as set forth in claim 1, further comprising:
a control rod drive mechanism (CRDM) including said motor and a lead screw, the motor operatively coupled with the lead screw to linearly drive the lead screw whereby a control rod containing a neutron poison connected with the lead screw is linearly driven into or out of a nuclear reactor core.

19. The apparatus as set forth in claim 1, further comprising:
a nuclear reactor including a pressure vessel containing primary coolant and a nuclear reactor core disposed in the pressure vessel and operative to maintain the primary coolant at a temperature of at least 300° C.; and
a control rod drive mechanism (CRDM) submerged in the primary coolant, the CRDM including said motor operatively couplet with a control rod containing a neutron poison to linearly drive the control rod into or out of the nuclear reactor core.

20. The apparatus as set forth in claim 1, further comprising:
a nuclear reactor including a pressure vessel containing primary coolant and a nuclear reactor core disposed in the pressure vessel and operative to maintain the primary coolant at a temperature of at least 300° C.; and
a control pump including said motor operatively connected with an impeller, the coolant pump submerged in the primary coolant and arranged to circulate or assist natural circulation of the primary coolant in the pressure vessel.

21. An apparatus comprising:
an electric motor including a rotor and a circumferential stator, the stator having a circumferential inner perimeter and a circumferential outer perimeter;
a plurality of electromagnets, each electromagnet having a bottom end, a top end, a central axis extending therebetween, a first width at its top end that is less than a second width at its bottom end, the first width and the second width being taken in a direction perpendicular to the central axis, the electromagnet comprising:
a plurality of nested freestanding electrically insulating former layers, each of the freestanding electrically insulating former layers having a height in a direction parallel to the central axis; and
a multilayer electrical coil comprising a plurality of spaced apart electrically conductive helical winding layers in which each spaced apart electrically conductive helical winding layer is supported by a corresponding one of the freestanding electrically insulating former layers of the nest that is slidably received within an adjacent one of the freestanding electrically insulating former layers, the height of the corresponding one of the freestanding electrically insulating former layers being greater than the height of the adjacent one of the freestanding electrically insulating former layers,
wherein electrically energizing the multilayer electrical coil generates a magnetic field in inside the multilayer electrical coil, and wherein the plurality of electromagnets are arranged within the stator so that the top end of each electromagnet is adjacent the circumferential inner perimeter and the bottom end of each electromagnet is adjacent the circumferential outer perimeter.

22. The apparatus as set forth in claim 21, wherein each freestanding electrically insulating former layer includes a groove formed on an outside surface of the freestanding electrically insulating former layer that defines the path of the helical winding layer supported by the freestanding electrically insulating former layer.

23. The apparatus as set forth in claim 21, wherein each electromagnet further comprises:
a ferromagnetic electromagnet core disposed inside the multilayer electrical coil.

24. The apparatus as set forth in claim 1, further comprising:
a nuclear reactor including a pressure vessel containing primary coolant and a nuclear reactor core disposed in the pressure vessel and operative to maintain the primary coolant at a temperature of at least 300° C.; and
at least one electromechanical component submerged in the primary coolant and including said electric motor.

25. The apparatus as set forth in claim 24, wherein the at least one electromechanical component comprises a primary coolant pump.

26. The apparatus as set forth in claim 24, wherein the at least one electromechanical component comprises a control rod drive mechanism (CRDM).

27. The apparatus as set forth in claim 1, wherein a cross-section of the electromagnet taken through the central axis is wedge-shaped.

28. The apparatus as set forth in claim 27, wherein the height of the outermost freestanding electrically insulating former layer is less than the height of the innermost freestanding electrically insulating former layer.

29. The apparatus as set forth in claim 21, wherein a cross-section of the electromagnet taken through the central axis is wedge-shaped.

30. The apparatus as set forth in claim 21, wherein the height of the outermost freestanding electrically insulating former layer is less than the height of the innermost freestanding electrically insulating former layer.

* * * * *

UNITED STATES PATENT AND TRADEMARK OFFICE
CERTIFICATE OF CORRECTION

PATENT NO. : 9,985,488 B2  
APPLICATION NO. : 13/188946  
DATED : May 29, 2018  
INVENTOR(S) : Brett T. Goodyear et al.

Page 1 of 1

It is certified that error appears in the above-identified patent and that said Letters Patent is hereby corrected as shown below:

On the Title Page

Item (73), Line 1, Assignee, please change "RWXT" to --BWXT--.

Signed and Sealed this  
Twenty-fifth Day of February, 2020

Andrei Iancu  
*Director of the United States Patent and Trademark Office*